(No Model.)
J. JACOBSON.
MIRROR.
No. 514,148.
Patented Feb. 6, 1894.
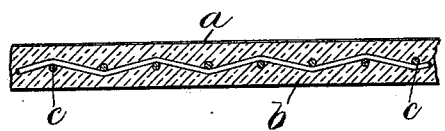
Witnesses
Jas. J. Maloney.
A. J. Locke.
Inventor
John Jacobson
by Jos. P. Livermore
Att'y.

UNITED STATES PATENT OFFICE.

JOHN JACOBSON, OF BOSTON, MASSACHUSETTS, ASSIGNOR TO ELMER P. HOWE, OF SAME PLACE.

MIRROR.

SPECIFICATION forming part of Letters Patent No. 514,148, dated February 6, 1894.

Application filed June 13, 1891. Serial No. 396,096. (No model.)

*To all whom it may concern:*

Be it known that I, JOHN JACOBSON, of Boston, county of Suffolk, State of Massachusetts, have invented an Improvement in Mirrors, of which the following description, in connection with the accompanying drawing, is a specification, like letters on the drawing representing like parts.

My invention relates to a mirror or looking glass and is embodied in a mirror composed of a thin film of metal having a polished surface and a cement backing or support upon which the said film is supported with its polished surface exposed.

In my Letters Patent No. 465,996, dated December 29, 1891, for a mirror and the method of making the same, I have set forth and claimed a method by which the mirror of this invention may be produced.

Mirrors heretofore commonly used are composed either of a metal plate having a polished reflecting surface, or of a thin film of metal supported upon a plate of glass and having its reflecting surface in contact with the glass through which the light passes to the said reflecting surface.

In the mirror forming the subject of this invention, on the other hand, the film is supported on a base or body, which need not be transparent, and has its reflecting surface exposed instead of in contact with the support for said film.

The drawing shows a sectional view of the mirror embodying this invention.

The said mirror comprises a film $a$ of silver or other metal capable of having a high polish so as to afford a reflecting surface. The said film $a$ is supported with its reflecting surface outward or exposed, upon a base $b$ which may be of cement or equivalent material capable of being applied to said film, while in a plastic condition and set or harden thereon. Gum shellac has been found in practice to be an excellent material to serve as the base or support for the reflecting film and the said shellac or cement material may be stiffened or strengthened if desired by wire netting or equivalent stiffening material, embedded therein as shown at $c$.

The mirror forming the subject of this invention is produced by depositing the reflecting film upon a form which may be a plate of glass, and which imparts the desired polish to the surface of the film, as in the case of an ordinary mirror or looking glass, in which the said film remains supported upon the glass on which it is deposited. After the film has thus been formed upon the glass so that its surface receives a high polish by contact therewith, the backing $b$ is applied thereto, said backing, when consisting of gum shellac, being melted or reduced to a semi-fluid or plastic condition, and flowed upon the film, while the latter remains upon the glass form on which it was deposited. The stiffening ribs or wires $c$, if used, may be embedded in the cement while still in plastic condition, and the cement then permitted to set or harden, after which the mirror may be removed from the form and will retain its high polish received from the form. Such a mirror is preferable to the ordinary mirrors in which the reflecting surface is supported upon a sheet of glass or transparent material, inasmuch as there is but a single reflecting surface, and no additional reflection or refraction of the light by striking upon the surface or passing through the medium on which the reflecting film is supported.

In some cases it may be desirable to reinforce the reflecting film by an additional film or sheet of cheaper metal, which may be done by depositing such additional metal thereon, as for example, by electro-plating the back of the film with copper, while still on the form, after which the cement is applied to the back of the compound film, and the whole removed from the form. This thickening or reinforcement of the film, is desirable when its reflecting face is to be covered with a lacquer or varnish to protect it from the atmosphere, since if the reflecting film is very thin, as would usually be the case when silver is used, the lacquer might penetrate the film and thus give it a somewhat blistered or uneven appearance.

An extremely thin film of silver is sufficient to afford a perfect reflecting surface and if a slightly greater thickness of metal is needed to prevent penetration, it is just as well to use a cheaper material, as just described, to reinforce the silver and thus effect the saving in cost over what would be required if sufficient silver were deposited to make an impermeable film.

I claim—

1. The within described improved article of manufacture, namely, a mirror having an exposed reflecting surface made as a film, and a rigid cementitious backing adherent thereto, as set forth.

2. A mirror having an exposed reflecting surface made as a film, and a rigid cementitious backing adherent thereto and provided with embedded stiffening means, substantially as described.

In testimony whereof I have signed my name to this specification in the presence of two subscribing witnesses.

JOHN JACOBSON.

Witnesses:
JOS. P. LIVERMORE,
M. E. HILL.